United States Patent [19]

Ralph et al.

[11] Patent Number: 4,932,069

[45] Date of Patent: Jun. 5, 1990

[54] ELEVATOR MOTOR CONTROL

[76] Inventors: George A. Ralph, 1140 Detwiler Dr.; Charles R. Holtzinger, 417 N. George St., both of York, Pa. 17404

[21] Appl. No.: 388,409

[22] Filed: Aug. 2, 1989

[51] Int. Cl.[5] ............ H02P 5/40

[52] U.S. Cl. ............ 318/809; 318/778; 318/779; 318/819

[58] Field of Search ............ 318/727-826; 187/29 R, 106-121

[56] References Cited

U.S. PATENT DOCUMENTS

| | | | |
|---|---|---|---|
| 2,809,334 | 10/1957 | Hixson et al. | 318/778 X |
| 3,546,550 | 12/1970 | Badal et al. | 318/761 |
| 3,639,820 | 2/1972 | Stemmler | 318/801 X |
| 3,725,756 | 4/1973 | McConnell et al. | 318/819 |
| 3,753,069 | 8/1973 | Newton | 318/778 X |
| 3,900,779 | 8/1975 | Kondratenko | 318/819 |
| 4,100,469 | 7/1978 | Nelson et al. | 318/779 |
| 4,142,136 | 2/1979 | Witter | 318/779 |
| 4,297,628 | 10/1981 | Hedges | 318/798 |
| 4,425,539 | 1/1984 | Wills | 318/771 |
| 4,443,748 | 4/1984 | Boer et al. | 318/821 X |
| 4,481,455 | 11/1984 | Sugimoto et al. | 318/778 |
| 4,481,456 | 11/1984 | Meyerand, Jr. et al. | 318/800 |
| 4,484,125 | 11/1984 | Hertz | 318/768 |
| 4,609,858 | 9/1986 | Sugita et al. | 318/778 |
| 4,634,951 | 1/1987 | Kampf et al. | 318/729 X |
| 4,791,340 | 12/1988 | Finney | 318/809 |

*Primary Examiner*—William M. Shoop, Jr.
*Assistant Examiner*—Paul Ip
*Attorney, Agent, or Firm*—Daniel J. O'Connor

[57] ABSTRACT

An apparatus and method for automatic leveling of elevator cars by controlled DC plugging of AC induction motors. The invention utilizes, in a novel circuit and control arrangement, the external neutral connection of a Y-wound motor design to inject controlled direct current into the neutral to dynamically control the braking to a stop. The elevator car is thus more safely and accurately leveled at the desired floor than has heretofore been known in the art. A novel speed control method is also disclosed which compares and sums positive and negative DC signals and which switches to the motor braking mode at a desired time.

7 Claims, 1 Drawing Sheet

ELEVATOR MOTOR CONTROL

BACKGROUND AND OBJECTS OF THE INVENTION

Figure 1:
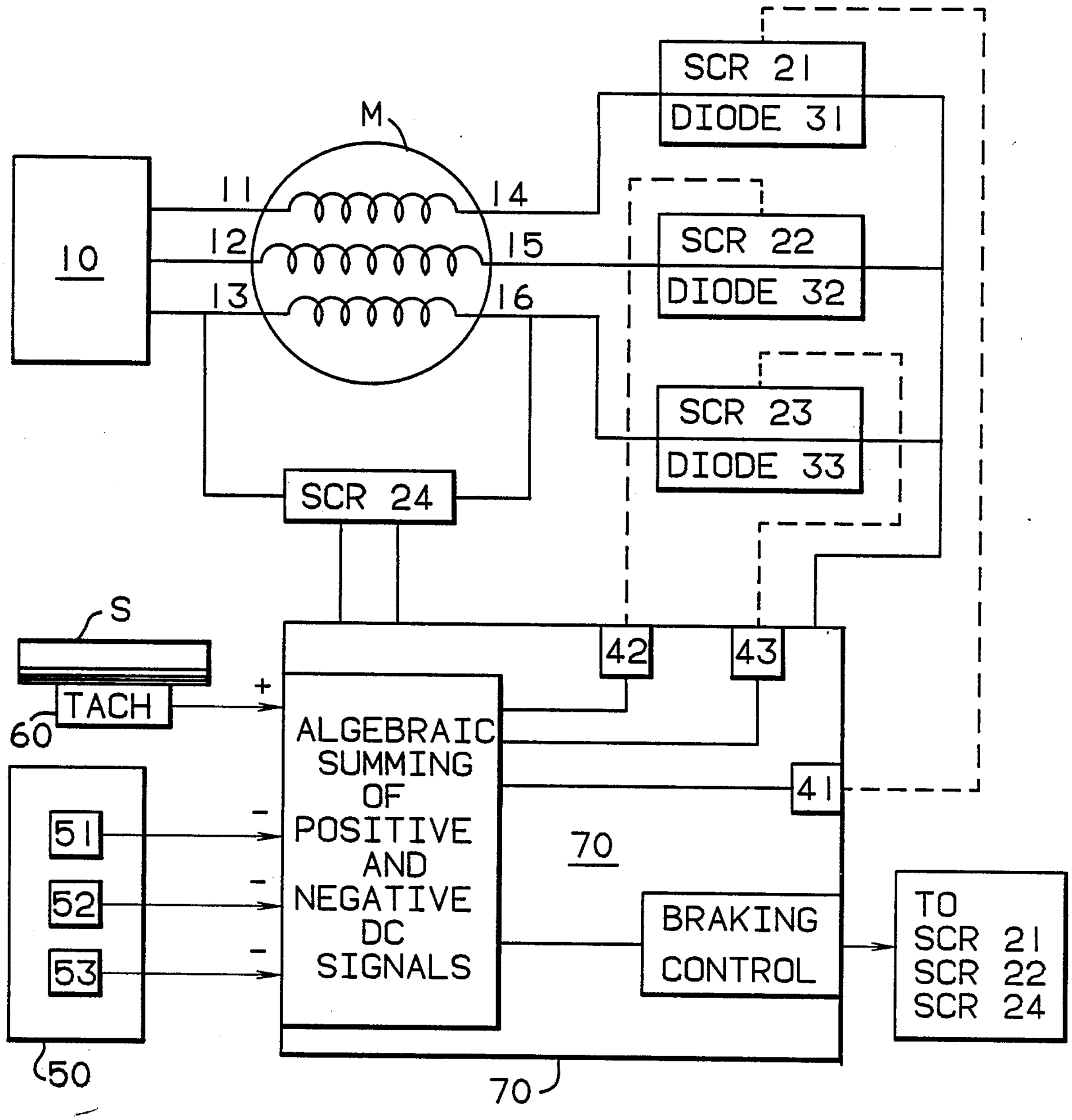

The use of single speed motors to drive elevator cars has been known in the art for a number of years.

In a typical usage, the elevator car was accelerated to the rated speed of the car. When the elevator car approached the desired floor, a stop was electromechanically activated at a predetermined distance from the floor.

In using a mechanical braking means to stop the elevator car, the stop position was dependent on load and the mechanical brake could not compensate for the variable loads and speeds encountered.

As a result, leveling of the car was often inaccurate and releveling was frequently required.

Because of the clearly dangerous conditions created by the prior art mechanical braking systems, the National Elevator Safety Code will soon require a more accurate leveling standard for single speed elevator cars.

Accordingly, it is an object of the present invention to achieve the accurate and automatic leveling of single speed elevator cars which will meet the standards of the National Elevator Safety Code.

It is a further object of the invention to utilize a solid state braking circuit which has been advantageously designed to decrease elevator car braking time as compared to prior art systems.

It is also an object of the invention to reduce the risk of injury to persons or goods which has arisen from the inaccurate leveling systems heretofore used in the art.

It is a still further object of the invention to accomplish the above goals while using a braking system which is economical to manufacture and which may be easily installed into existing elevator car systems.

It is also an object of the invention to control elevator motor speed by utilizing the external neutral connections of an AC motor for ease of installation and maintenance.

These and other objects and advantages of the invention will be clear to those of skill in the elevator control arts from the description which follows.

SUMMARY OF THE INVENTION

Multiple silicon controlled rectifiers (SCR's) are utilized in a circuit to control the acceleration, deceleration, speed and stopping of an AC squirrel cage three-phase induction motor having Y-connections.

The system is designed to operate in combination with a motor having neutral leads positioned externally thereof. Such motors with external neutral leads are currently used in the elevator arts.

Three neutral motor leads are connected to SCR circuitry which controls motor currents in the neutral side of the motor winding. Lowering the impedance of the SCR's permits current to flow through the drive motor stator windings which results in motor rotation. Similarly, raising the impedance levels of the SCR's reduces stator current and the motor will run at a lower speed.

The impedance levels of the SCR's are in turn determined by the algebraic sum of two separate DC control signals.

The first DC control signal is a negative DC signal which varies depending upon whether a leveling speed, an intermediate speed or a high speed are selected.

The second DC control signal is a positive DC signal which is derived from a tachometer directly coupled to the shaft of the drive motor.

The negative and positive DC signals are combined in the method of the present invention and used to provide optimal speed and load regulation by varying the impedance levels of the SCR's connected to the neutral side of the motor winding.

Elevator braking is achieved by a novel method of alternately firing the SCR's which decreases braking time. The braking circuit and braking method are activated whenever the negative DC control signal drops below the positive DC tachometer signal in amplitude.

BRIEF DESCRIPTION OF THE DRAWING FIGURE

FIG. 1 shows the principal elements of the motor control method in block diagram form for clarity of understanding the invention. It is noted that FIG. 1 shows the part of a motor M wherein the neutral leads are brought out from a Y-connected portion with the traditional Y-connected arrangement not being shown.

DESCRIPTION OF THE PREFERRED METHOD EMBODIMENT

As shown in the schematic diagram of FIG. 1, three phase voltage is applied to the control terminals 11, 12 and 13 of an induction motor M from power supply 10.

Three neutral motor leads 14, 15 and 16 are also shown in the figure. The neutral lead 14 is connected to SCR-21. Neutral lead 15 is connected to SCR-22. Neutral lead 16 is wired to SCR-23.

As further shown in the figure, SCR-21 is connected to trigger 41 on controller 70. The SCR-22 is connected to trigger 42 on controller 70 while SCR-23 is connected to trigger 43.

A fourth SCR, denominated as SCR-24, is connected outside of terminals 13 and 16 as shown and is further wired to controller 70.

Diode elements 31, 32 and 33 are also connected to the neutral terminals 14, 15 and 16 and the utility of same will be hereinafter described with reference to the braking circuit.

When a three phase line voltage is applied to terminals 11, 12 and 13, no stator current flows because of the infinite impedance characteristic of the SCR's. Consequently, the drive motor will not run.

In order to reduce the impedance of SCR's 21, 22 and 23, pulses are applied to the gates thereof via triggers 41, 42 and 43 at controller 70.

To accomplish the above, a negative DC signal is applied to the controller 70 from logic relay element 50, i.e. from elements 51, 52 or 53, depending upon whether leveling speed, intermediate speed, or high speed function is selected.

Simultaneously, a positive DC signal is applied to the controller 70. The positive DC signal is derived from DC tachometer 60 which is directly coupled to the shaft S of the drive motor M.

The negative and positive DC signals are combined in controller 70 and used to control impedance levels of the SCR's and hence motor speed. Stated another way, motor speed is determined by the impedance of the SCR's which is determined by the algebraic sum of the positive and negative DC control signals.

For example, if selector 50 called for a high speed elevator function 53, a maximum negative DC signal would be applied to controller 70. If, simultaneously, the positive DC signal from tachometer 60 were very low, a pulse is sent to the gates of each SCR to lower their impedance and rotate the motor in a high speed mode.

A braking circuit may also be advantageously used with the above-described circuitry and method.

Such braking circuit is activated whenever the negative DC signal from the selector control 50 drops below the positive DC tachometer signal in amplitude.

The elevator braking circuit operates as described below.

When initiated with A-B-C Phase Rotation, the braking circuit will alternately "fire" SCR-21 and SCR-24. During one half cycle of the applied AC, SCR-21 will turn on and current will flow through one set of motor stator windings and SCR-21. This current flow will return through the other two sets of stator windings through D-32 and D-33 diodes. As a result of this action DC will flow through the stator windings which will tend to oppose the direction of rotor rotation. During the next half cycle of applied AC, SCR-24 will fire and SCR-21 will turn off which will short circuit one set of stator windings to collapse the back EMF build up in the motor, thereby further decreasing braking time. SCR-21 and SCR-24 will never turn on simultaneously nor will SCR-22 and SCR-23 ever turn on during a braking cycle.

When initiated with B-A-C Phase Rotation, the braking circuit will alternately "fire" SCR-22 and SCR-24. During one half cycle of the applied AC, SCR-22 will turn on and current will flow through one set of motor stator windings and SCR-22. This current flow will return through the other two sets of stator windings through D-31 and D-33 diodes. As a result of this action DC will flow through the stator windings wich will tend to oppose the direction of rotor rotation. During the next half cycle of applied AC, SCR-24 will fire and SCR-22 will turn off which will short circuit one set of stator windings to collapse the back EMF build up in the motor, thereby further decreasing braking time. SCR-22 and SCR-24 will never turn on simultaneously nor will SCR-21 and SCR-23 ever turn on during a braking cycle.

From the foregoing description, it will be understood by those of skill in the art that controller 70 may be of any commercially available type which is capable of performing the requisite triggering functions on the SCR motor control circuitry. In addition, the controller 70 must be capable of receiving and summing the positive and negative DC control signals from the tachometer 60 and speed selector 50.

A novel method of utilizing existing AC motors and electronic components for elevator motor control and braking is the heart of the present invention.

While there has been illustrated and described what is deemed a preferred embodiment of the invention, numerous changes may be made by those of skill in the art whitout departing from the spirit and scope of the claimed invention.

For example, the control system and method if designed for use with a Y-connected induction motor, However, the principles employed may have utility in other related arts and it is intended to cover all such uses herein. The features set forth could have utility in any motor system wherein the neutral leads are brought out for simplified addition of the SCR control system of the present invention.

I claim:

1. A control system for a three phase induction motor wherein said motor has a first control terminal (11), a second control terminal (12) and a third control terminal (13), wherein said motor has a first neutral lead (14), a second neutral lead (15) and a third neutral lead (16), wherein said first neutral lead (14) has a first SCR (21) connected thereto and wherein said first SCR (21) is wired to a first trigger (41) on a control means (70), wherein said second neutral lead (15) has a second SCR (22) connected thereto and wherein said second SCR (22) is wired to a second trigger (42) on said control means (70), wherein said third neutral lead (16) has a third SCR (23) connected thereto and wherein said third SCR (23) is wired to a third trigger (43) on said control means (70), wherein said control system includes a first means (50) for generating a negative DC signal representative of speed selected (51, 52, 53) and for supplying said negative DC signal to a summing portion of said control means (70), wherein said control system includes a second means (60) for generating a positive DC signal representative of motor speed and for supplying said positive DC signal to a summing portion of said control means (70), means (41, 42, 43) wherein said summed signals are transmitted to said SCR's wherein their impedance is lowered and the current of the motor is increased or wherein their impedance is raised and the current of the motor is decreased.

2. The control system of claim 1 wherein said system further has a fourth SCR (24) connected between said third control terminal (13) and said third neutral lead (16), and wherein said fourth SCR (24) is also connected to said control means (70).

3. The control system of claim 2 wherein said first neutral lead (14) further has a diode (31) connected thereto and wherein said diode (31) is wired to said control means (70).

4. The control system of claim 3 wherein said second neutral lead (15) further has a diode (32) connected thereto and wherein said diode (32) is wired to said control means (70).

5. The control system of claim 4 wherein said third neutral lead (16) further has a diode (33) connected thereto and wherein said diode (33) is wired to said control means (70).

6. The control system of claim 5 including means whereupon, in the braking mode, said first SCR (21) is alternately fired with said fourth SCR (24) to provide means whereby direct current may flow via said second diode (32) and said third diode (33) to allow direct current to flow through the stator windings which will tend to oppose the direction of rotor rotation.

7. The control system of claim 1 wherein said AC induction motor is of the Y-connected type having external leads (14, 15, 16) wired thereto.

* * * * *